Sept. 1, 1936.　　F. J. BARTHOLOMEW　　2,052,544
CONDITIONING ACID SLUDGE
Filed Oct. 4, 1933
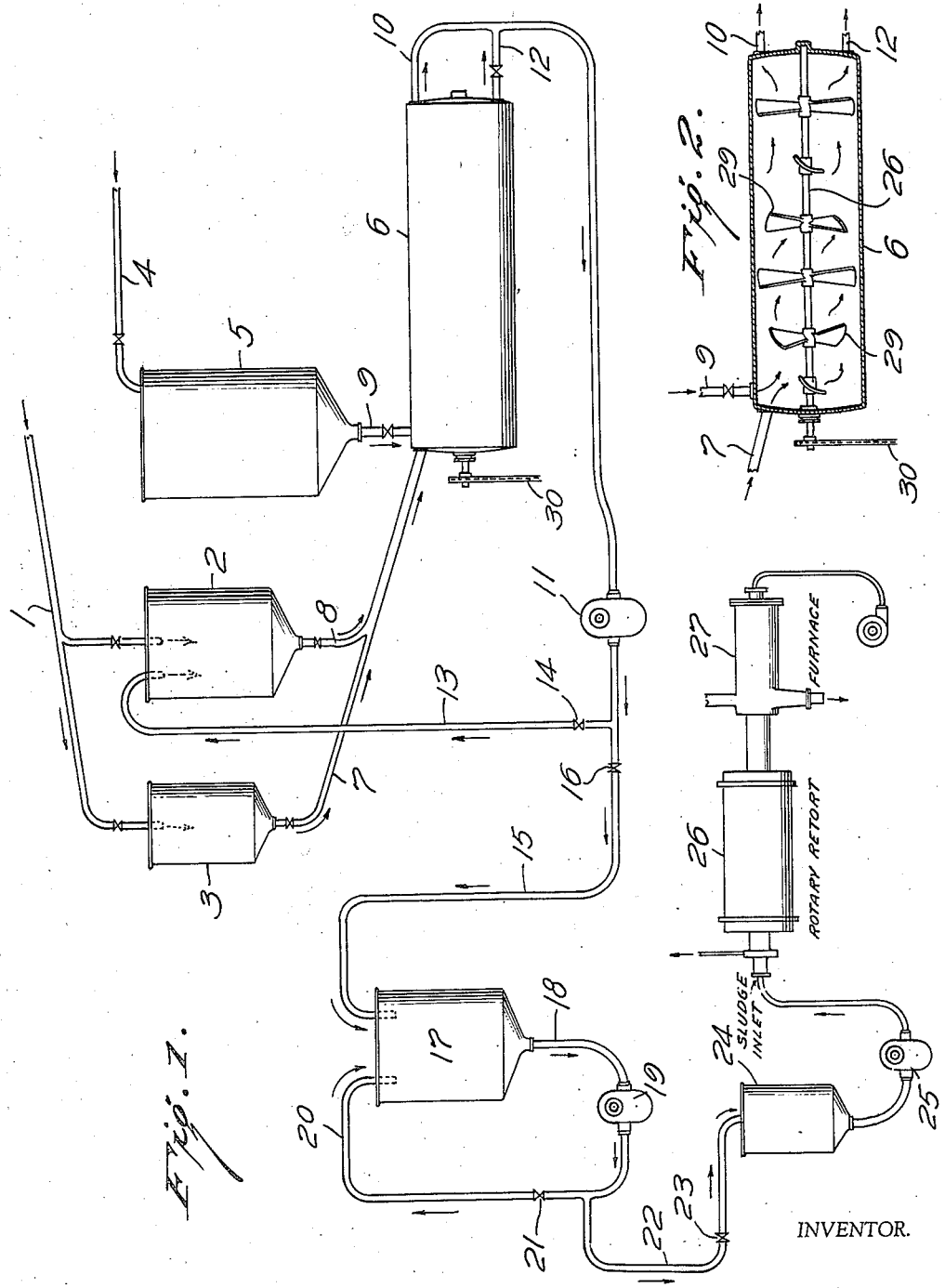
INVENTOR.
BY F. J. BARTHOLOMEW
Robert Ames Norton
ATTORNEY.

Patented Sept. 1, 1936

2,052,544

UNITED STATES PATENT OFFICE 2,052,544

CONDITIONING ACID SLUDGE

Frank J. Bartholomew, Westfield, N. J., assignor to Chemical Construction Corporation, New York, N. Y., a corporation of Delaware Application October 4, 1933, Serial No. 692,104

3 Claims. (Cl. 23—177)

This invention relates to the conditioning of acid sludge from the sulphuric acid purification of carbonaceous material such as petroleum.

The recovery of the $SO_4$ content of acid sludges has presented a serious problem as these sludges are produced in large tonnage in the refining of petroleum and constitute a serious nuisance. Various processes of decomposing acid sludge to produce $SO_2$ have been proposed, none of which have achieved any commercial success until the Hechenbleikner process was developed as described in Patent No. 1,953,225, issued April 3, 1934. In this process acid sludge is fed into a kiln in counter current to combustion gases and is thermally decomposed into $SO_2$ and a carbonaceous residue. In order to operate satisfactorily in the Hechenbleikner process or, for that matter, under the commercially unsuccessful prior art processes, it is necessary to be able to feed sludge regularly to the decomposing operation. This, however, has presented a serious problem because sludges of various degrees of viscosity are normally produced in a petroleum refinery and in order to operate satisfactorily a continuous sludge decomposition process, it is necessary to feed a sludge of as uniform characteristics as possible. Particularly, it is very difficult or impossible to obtain a satisfactory operation with highly viscous sludges which are produced in some quantity in many refineries. Moreover, the various amounts of different sludges will vary during operation and during storage. For example, the oxygen of the air reacts with certain of the asphaltenes. Even with sludges having substantially the same ratio of hydrogen to carbon originally, these ratios may be very considerably changed on storage, and of course the viscosities are greatly increased. The changes in storage on exposure to the air are normally more marked with heavy sludges which contain large amounts of asphaltenes and other reactive unsaturated hydrocarbons. Thus some heavy lubricating oil sludges may contain as high as 27% asphaltenes and will show serious chemical changes on standing. Light sludges do not change on standing to anything like the extent of heavy sludges, because of their much lower asphaltene content.

According to the present invention, I have found that it is possible to condition the sludge produced by a plant by a mixing of thin and heavy sludges in suitable proportions to obtain a sludge of uniform desired characteristics. The present invention also provides for the maintenance of the uniform mixed sludge and prevents stratification, which, of course, would introduce the same original difficulty of non-uniform sludge characteristics. I have found that if heavy sludge is fed in small amounts to thinner sludge and a considerable body of the mixed sludge is kept circulating so that the amount of heavy sludge added at any time is a small proportion of the total volume, a satisfactory thinning and conditioning of the sludge is obtained and such a sludge may be used directly in suitable sludge decomposing systems.

While in its broader aspects the present invention is not limited to any particular procedure of utilization of the mixed sludge body, in a more specific form I have found that it is desirable to provide for storage means for the mixed sludge, as otherwise the continuous operation of a sludge decomposition process would be jeopardized if there were any temporary shut down of the sludge conditioning system, such as, for example, for cleaning or adjustment of the machinery. It is therefore desirable to provide for storage of the mixed or conditioned sludge, but in such storage the same problem of stratification is encountered, and I have found that the mixed sludge can be stored satisfactorily if it is continuously circulated through the storage tank. This prevents stratification and permits storage for a practically indefinite period. In practical operation of course the storage period, for any given amount of sludge, is not very long, as a portion is being continuously drawn off for use in the decomposition plant. In ordinary operation no stratification whatever is noticed in the sludge and a sludge of extraordinarily uniform characteristics, both chemical and physical, is continuously available for decomposition. In the preferred modification of the invention, therefore, both sludge conditioning or liquefaction and conditioned sludge storage is included. Where, however, the storage is not deemed necessary, it may be eliminated.

The invention has been described particularly in conjunction with a sludge decomposition system in which the sludge is thermally decomposed to $SO_2$ and a carbonaceous residue. In conjunction with processes of this type the invention presents its greatest utility, but it should be understood that the conditioned sludge with or without storage may also be used for any other purpose for which it may be required. Thus, for example, it may be burned where burning systems are used, and of course the uniform viscosity of the conditioned sludge renders it particularly suitable for operation of burners without clogging. The sludge may also be employed in processes in which the acid is recovered as such, for example by dilution with water and concentration. Such processes do not normally require a sludge of as great uniformity as does the thermal decomposition process, but it is desirable to have a sludge which is not too viscous for satisfactory contact with diluting water, and a uniform, satisfactorily fluid sludge is useful even in processes where the chemical uniformity is not of such great importance and where a more non-uniform sludge could be used even though less advantageously.

Some refineries do not attempt to recover the sulphuric acid in the acid sludge, but pump it to pools where it is permitted to solidify and is treated as waste. For such refineries the present invention is of less importance, although it may be employed where highly viscous sludges are produced in considerable quantities, because it is difficult to pump such sludges any considerable distance into storage pools and the thinning and uniform viscosity which are obtained by using the features of the present invention are of advantage even when the sludge is not to be utilized for the recovery of its constituents and wherever a sludge of uniform or lower viscosity is required, even if only for the purpose of pumping it to waste piles, the present invention may be utilized. In other words, the present invention which permits obtaining a sludge of extremely uniform physical and chemical characteristics, is of particular advantage where the sludge is to be utilized in processes where the uniformity of both characteristics are prerequisites. However where uniform physical properties only are required, this portion of the invention may be utilized, and such procedures are of course also included in the present application.

Essentially, the present invention is a process invention, that is to say, it is not primarily concerned with particular structural designs of apparatus in which it is to be carried out. Broadly, therefore, the invention is not limited in any way to particular apparatus types, but I have found that very desirable results are obtained by using a liquefier in which agitation and forward transportation of the sludge material is provided, so that it is thoroughly agitated during a considerable period of time over a considerable distance. Therefore, while other types of apparatus may be used, and are included, I prefer in most cases to use a liquefier with combined agitation and transportation means, and this forms a specific feature of the preferred embodiment of the invention. In accordance with the essential process character of the invention, the drawing is for the most part in semi-diagrammatic form, except that the design of the liquefier is shown in somewhat greater detail.

In the drawing Figure 1 shows, in diagrammatic form, a flow sheet of the process, the various pieces of apparatus being in elevation; and Figure 2 shows a detailed vertical section of the liquefier tank.

Referring to Figure 1 of the drawing, thin sludge enters the system through the pipe (1), flowing into the mixed sludge tank (2) and the thin sludge reserve tank (3), the relative amount of flow into the two tanks being controlled by the respective valves in the branch pipes entering them. Heavy sludge enters through the valved pipe (4) into the heavy sludge tank (5) whence it is permitted to flow continuously in small quantities into the liquefier (6) through the valved pipe (9). The valved pipe (7) leads from the thin sludge reserve tank (3) to the top of the liquefier (6) entering immediately adjacent to the pipe (9), so that the heavy sludge and thin sludge streams contact immediately on entering the liquefier. In the liquefier there is a shaft (28) provided with propeller blades (29) (see Figure 2). The shaft is driven by any suitable drive means, for example, by chain and sprocket (30). The sludge body is churned and mixed by the rotation of the blades and at the same time due to the pitch of the blades it is slowly moved along through the liquefier, gradually overflowing through the pipe (10) from which it is pumped by means of the pump (11) up through the pipe (13) into the mixed sludge tank (2). Thence it flows through a valved pipe (8) into the pipe (7) and recirculates back through the liquefier. If it is desired, a portion of the sludge may be withdrawn from the bottom of the liquefier tank through the valved pipe (12) which leads into the pipe (10). The valve may be adjusted so that there is a small continuous flow through the pipe or, when it is desired to empty the tank for cleaning the valve may be opened wide.

It will be apparent that since a considerable portion of the liquefied mixed sludge is recirculated through the liquefier, the proportion of heavy sludge to the total volume of sludge in the liquefier at any time is small, and of course much smaller than its proportion to the thin sludge added to the system. This is an important feature because it is difficult to mix satisfactorily large amounts of heavy sludge, whereas, when the heavy sludge is added in small quantities together with the required amounts of thin sludge, to a relatively large body of conditioned mixed sludge, the mixture is achieved with great facility. This procedure also has the additional advantage that fluctuations in the character of the heavy sludge or the thin sludge will not result in as large fluctuations in the characteristics of the mixed sludge because of the relatively large volume of the latter compared to the amount of thin or heavy sludge added at any one time. This is important because the heavy sludge and the thin sludge will vary from hour to hour, and it is frequently undesirable to supervise the liquefaction carefully at all times. Thus, for example, if there is any considerable change in viscosity of the heavy sludge, which would of course affect the amount fed, no very great change in the characteristics of the mixed sludge would be noticeable for a considerable period of time, so that supervision and test of the incoming sludge at relatively long intervals suffices when the present process is used, whereas if there were not a large body of mixed sludge constantly circulated, it would be necessary to keep constant check on the characteristics of the heavy sludge and thin sludge with a corresponding increase in the cost of supervision, always a serious item with a product of such low unit value.

The thin sludge and heavy sludge are constantly being added to the circuit of mixed sludge through the liquefier and a corresponding amount of mixed sludge is of course drawn off. This takes place through the pipe (15) which leads to the mixed sludge storage tank (17). Pipes (13) and (15) respectively are controlled by valves (14) and (16) and a suitable adjustment on these valves will determine the proportion of the mixed sludge recirculated. Naturally, of course the adjustment of these valves must be proportioned to the adjustment of the valves in the pipes 7, 8 and 9, because in the long run the amount of sludge flowing out through the pipe (15) must correspond to the amount of sludge flowing into the liquefier from the pipes (1) and (4). The tanks (2), (3) and (5) of course provide a considerable leeway, so that changes in the inflow through pipes (1) and (4) which might otherwise necessitate some adjustment of valves (14) and (16) will not immediately cause any change in the level in the liquefier tank (6). Of course the larger the size of the tank (2), the greater this flywheel effect. On the other hand, it is not desirable to provide too large a tank, as the sludge is relatively quiescent in this tank, and, if the tank is too large, stratification may take place. Therefore, the tank should normally only be sufficiently large to provide for ordinary fluctuations in sludge feed.

The conditioned sludge entering the mixed sludge storage tank (17) will not remain uniform indefinitely if permitted to stand quietly as it tends to stratify. Therefore a sludge circulation through the tank (17) is provided by means of the pump (19) which draws sludge through the pipe (18) and discharges it through the pipe (20) back into the tank (17). The rate of flow may be controlled by the valve (21).

Normally a certain proportion of sludge is drawn off from the mixed sludge storage tank for use in whatever system is employed for utilization of the conditioned sludge. In the drawing this is shown, for example, as an internally fired retort employed in the Hechenbleikner thermal sludge decomposition system. The flow is from the pipe (18) through the pipe (22) into the feed tank (24) from which it is delivered by means of the pump (25) into the decomposition kiln (26) which is heated by combustion gases from the furnace (27). The amount of sludge flowing through the pipe (22) is controlled by the valve (23) and a suitable adjustment of the valves (21) and (23) will determine the ratio of the sludge recirculated through the tank (17) to that which passes on through the decomposition system. With a satisfactorily rapid circulation through the tank (17), the sludge will remain uniform without stratification for long periods of time. The size of the tank (17) will of course depend on the nature of the sludge utilization system, and particularly on the normal length of shutdown periods, if any, to be encountered in the system; the longer the shut down periods, the larger the tank (17) should be. In general this tank may be of quite considerable size if a rapid circulation of sludge is maintained. It should be borne in mind that the drawing is a purely diagrammatic one and really constitutes in effect a flow sheet. Thus no attempt has been made to maintain any scale. For example, the kiln (26) in a normal plant may be considerably larger than the tank (17), or the liquefier (6). It is shown merely as indicating the course of the process and not in any sense as representing a true design of apparatus.

While the drawing shows the sludge conditioning system of the present invention as applied to the Hechenbleikner thermal decomposition process, it is of course obvious that the sludge may be fed to any other type of process either depending on thermal decomposition or on dilution to regenerate or recover sulphuric acid. Where the process does not operate continuously and the additional safeguard of a mixed sludge storage system is deemed unnecessary, this portion of the system can, of course, be eliminated. In such a case, the pipe (15) would lead directly to the feed tank (24). Where mixed sludge storage is eliminated it would normally be desirable to provide a somewhat larger tank (2), and to recirculate a larger proportion of the sludge. The best compromise for adaptation to the particular conditions of a given installation will of course be chosen by the engineer designing the plant, and it is an advantage of the present invention that great flexibility is provided and the principles of the invention are applicable to refineries having the most varied conditions.

Where it is not desired to utilize the sludge in processes which result in the recovery of some of its constituents, and it is merely to be pumped into waste pools, the mixed sludge storage is of course unnecessary and the liquefaction system may be considerably simplified, as it is no longer necessary to provide for great uniformity, it being sufficient if the sludge is rendered sufficiently fluid to be satisfactorily pumped. This permits a much greater capacity for a given liquefier. In general, a compromise between maximum uniformity, which is achieved by a very large proportion of recirculated sludge, and maximum output capacity, which is achieved by a minimum recirculation of sludge, is always required, and the particular amount of recirculation of the sludge will be determined in every installation in accordance with the conditions encountered. The present invention therefore is not concerned with any particular definite proportion of recirculation, as this will vary with varying types of sludge and with the requirements for uniformity which are in turn determined by the nature of the process in which the sludge is to be used. It is an advantage of the present invention that it is applicable to widely varied sludges without any considerable modification; and a further advantage lies in the fact that, once built, the system is extremely flexible and can handle a wide range of sludges, since the amount of recirculation and the relative feeds of thin and heavy sludge are not fixed even when the particular design of apparatus is chosen, but are subject to regulation by simple adjustment of valves, so that when a change in the characteristic of the sludge in a given refinery becomes necessary, no equipment need be scrapped, and such changes can be simply and immediately taken care of by suitable adjustment of the valves in the system.

I claim:

1. A method of conditioning acid sludge which comprises circulating a relatively large body of sludge which has been conditioned by mixing thick and thin sludges in proportion to produce a sludge of the desired consistency through a circuit provided at one point with mixing and agitating means, introducing into the circuit small amounts of thin and heavy sludge in proportion to maintain the composition of the conditioned sludge, continuously removing a portion of the conditioned sludge at a point remote from the introduction of the thin and heavy sludge, introducing said removed sludge into a conditioned sludge storage receptacle and continuously circulating the mixed sludge through a circuit provided with a pump and which withdraws sludge from the storage receptacle and returns it thereto, at a point in the receptacle widely separated from the point of withdrawal, the speed of circulation being sufficient to substantially prevent stratification during storage.

2. A method according to claim 1 in which a portion of the sludge from the circuit in the conditioned sludge storage receptacle is continuously removed and subjected to thermal decomposition to form $SO_2$.

3. A method of conditioning acid sludge which comprises circulating a relatively large body of sludge which has been conditioned by mixing thick and thin sludges in proportion to produce a sludge of the desired consistency through a circuit containing a liquefying zone with agitating and mixing means which simultaneously effect forward movement of the sludge, continuously adding relatively small amounts of thin and thick sludge to the circuit in the liquefying zone, continuously removing a portion of the conditioned sludge in the circuit beyond the liquefying zone, said liquefying zone being provided with a gravity overflow whereby the sludge in said liquefying zone is continuously maintained at a predetermined level, regardless of temporary fluctuations in the relative feed of thin and thick sludge and removal of conditioned sludge.

FRANK J. BARTHOLOMEW.